(12) United States Patent
Koka et al.

(10) Patent No.: US 9,390,016 B2
(45) Date of Patent: Jul. 12, 2016

(54) ACCESSING AN OFF-CHIP CACHE VIA SILICON PHOTONIC WAVEGUIDES

(71) Applicant: Oracle International Corporation, Redwood City, CA (US)

(72) Inventors: Pranay Koka, Austin, TX (US); Michael O. McCracken, San Diego, CA (US); Herbert D. Schwetman, Jr., Austin, TX (US); Ronald Ho, Mountain View, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 223 days.

(21) Appl. No.: 13/665,826

(22) Filed: Oct. 31, 2012

(65) Prior Publication Data

US 2014/0122802 A1 May 1, 2014

(51) Int. Cl.
*G06F 12/00* (2006.01)
*G06F 12/08* (2016.01)

(52) U.S. Cl.
CPC ........ *G06F 12/0848* (2013.01); *G06F 12/0893* (2013.01)

(58) Field of Classification Search
CPC .......................... G06F 12/0848; G06F 12/0893
USPC .......................................................... 711/118
See application file for complete search history.

(56) References Cited

U.S. PATENT DOCUMENTS

| | | | | |
|---|---|---|---|---|
| 5,422,859 A * | 6/1995 | Masuda | .................... | G11C 7/22 365/191 |
| 5,446,809 A * | 8/1995 | Fritz et al. | ....................... | 385/17 |
| 6,415,357 B1 * | 7/2002 | Wright et al. | .................. | 711/133 |
| 6,810,182 B2 * | 10/2004 | Grote et al. | ...................... | 385/42 |
| 6,954,576 B2 * | 10/2005 | Mule'et al. | .................... | 385/131 |
| 8,064,739 B2 * | 11/2011 | Binkert | ..................... | G02B 6/43 365/64 |
| 8,355,605 B1 * | 1/2013 | Wach | .............................. | 385/16 |
| 2003/0174946 A1 * | 9/2003 | Viens | .............................. | 385/37 |
| 2011/0133063 A1 * | 6/2011 | Ji et al. | ..................... | 250/227.24 |

OTHER PUBLICATIONS

Huh, Jaehyuk. Hardware Techniques to Reduce Communication Costs in Multiprocessors. The University of Texas at Austin [online] 2006, [retrieved on Aug. 25, 2014]. Retrieved from the Internet <URL: http://www.cs.utexas.edu/~cart/publications/dissertations/huh.pdf>.*

Huh, "Hardware Techniques to Reduce Communication Costs in Multiprocessors", The University of Texas at Austin, May 2006.

* cited by examiner

*Primary Examiner* — Larry MacKall
(74) *Attorney, Agent, or Firm* — Park, Vaughan, Fleming & Dowler LLP

(57) ABSTRACT

The disclosed embodiments provide a system in which a processor chip accesses an off-chip cache via silicon photonic waveguides. The system includes a processor chip and a cache chip that are both coupled to a communications substrate. The cache chip comprises one or more cache banks that receive cache requests from a structure in the processor chip optically via a silicon photonic waveguide. More specifically, the silicon photonic waveguide is comprised of waveguides in the processor chip, the communications substrate, and the cache chip, and forms an optical channel that routes an optical signal directly from the structure to a cache bank in the cache chip via the communications substrate. Transmitting optical signals from the processor chip directly to cache banks on the cache chip facilitates reducing the wire latency of cache accesses and allowing each cache bank on the cache chip to be accessed with uniform latency.

16 Claims, 4 Drawing Sheets

US 9,390,016 B2

ACCESSING AN OFF-CHIP CACHE VIA SILICON PHOTONIC WAVEGUIDES

GOVERNMENT LICENSE RIGHTS

This invention was made with United States Government support under Agreement No. HR0011-08-9-0001 awarded by the Defense Advanced Research Projects Administration (DARPA). The United States Government has certain rights in the invention.

BACKGROUND

1. Field of the Invention

This disclosure generally relates to techniques for implementing off-chip caches for computer systems. More specifically, this disclosure relates to techniques for using a separate cache chip that is accessed using optical waveguides that connect directly to each cache bank.

2. Related Art

High instruction throughput in a processor typically involves rapid translation of virtual addresses and fast memory accesses. To achieve such throughput, the memory subsystem of the processor may include a number of specialized hardware structures, including multiple levels of caches. Such caching structures reduce the average latency of memory accesses.

Most workloads generally benefit from a larger cache size. However, in single-chip processor designs, the amount of space available for caches is limited by die size and the area required for the processor cores and other structures. Large caches also suffer from significant wire delays, which can lead to non-uniform access times for different cache banks or may require the use of optimized wires that consume more area and introduce additional routing complexity. Placing large caches on a separate chip reduces some area limitations, but off-chip electronic connections typically do not provide sufficient bandwidth for high-speed cache access.

Hence, what is needed are techniques for accessing caches without the above-described problems of existing cache designs.

SUMMARY

The disclosed embodiments provide a system in which a processor chip accesses an off-chip cache via silicon photonic waveguides. The system includes a processor chip and a cache chip that are both coupled to a communications substrate. The cache chip comprises one or more cache banks that receive cache requests from a structure in the processor chip optically via a silicon photonic waveguide. More specifically, the silicon photonic waveguide is comprised of waveguides in the processor chip, the communications substrate, and the cache chip, and forms an optical channel that routes an optical signal directly from the structure to a cache bank in the cache chip via the communications substrate. Transmitting optical signals from the processor chip directly to cache banks on the cache chip facilitates reducing the wire latency of cache accesses and allowing each cache bank on the cache chip to be accessed with uniform latency.

In some embodiments, separate bi-directional optical channels route optical signals from the structure in the processor chip to each cache bank of the cache chip. Note that each optical channel transmits optical signals directly from this structure to the cache bank associated with the respective optical channel. A cache bank receiving a request via an optical channel then performs a cache lookup operation, and uses the optical channel (e.g., the silicon photonic waveguide) to optically send a response to the structure.

In some embodiments, the structure in the processor chip is a cache controller that receives cache requests from multiple processor cores in the processor chip. In these embodiments, the cache controller determines a target cache bank on the cache chip for a cache request and then routes an optical signal for the cache request to the silicon photonic waveguide associated with the target cache bank. In alternative embodiments, a processor core in the processor chip communicates directly with the cache chip (e.g., instead of using a cache controller as an intermediary), and directly determines and sends cache requests to the target cache bank via an optical channel.

In some embodiments, separate, distinct silicon photonic waveguides route optical signals from one or more structures on the processor chip to each cache bank in the cache chip.

In some embodiments, a silicon photonic waveguide comprises multiple optical channels that are partitioned using wavelength-division multiplexing. Multiple wavelengths transmit optical signals to multiple cache banks, each of which is associated with a different optical wavelength. The optical signals for each cache bank are routed using drop filters that filter optical wavelengths to their respective cache banks.

In some embodiments, two or more silicon photonic waveguides are combined into an optically switched network in which an optical switch selectively routes cache requests to their target cache banks.

In some embodiments, a second cache chip is coupled to the communications substrate, and the structure in the processor chip is configured to communicate with cache banks on both cache chips using one or more silicon photonic waveguides.

In some embodiments, a second processor chip is coupled to the communications substrate, and structures in both processor chips are configured to optically communicate with cache banks on the cache chip. In some embodiments, the two processor chips both communicate with the cache chip using separate, distinct sets of silicon photonic waveguides.

In some embodiments, an inter-layer coupler guides the optical signal from the processor chip into a portion of the silicon photonic waveguide in the communications substrate, and a second inter-layer coupler guides the optical signal from the communications substrate into the cache chip.

DETAILED DESCRIPTION

Figure 1A:
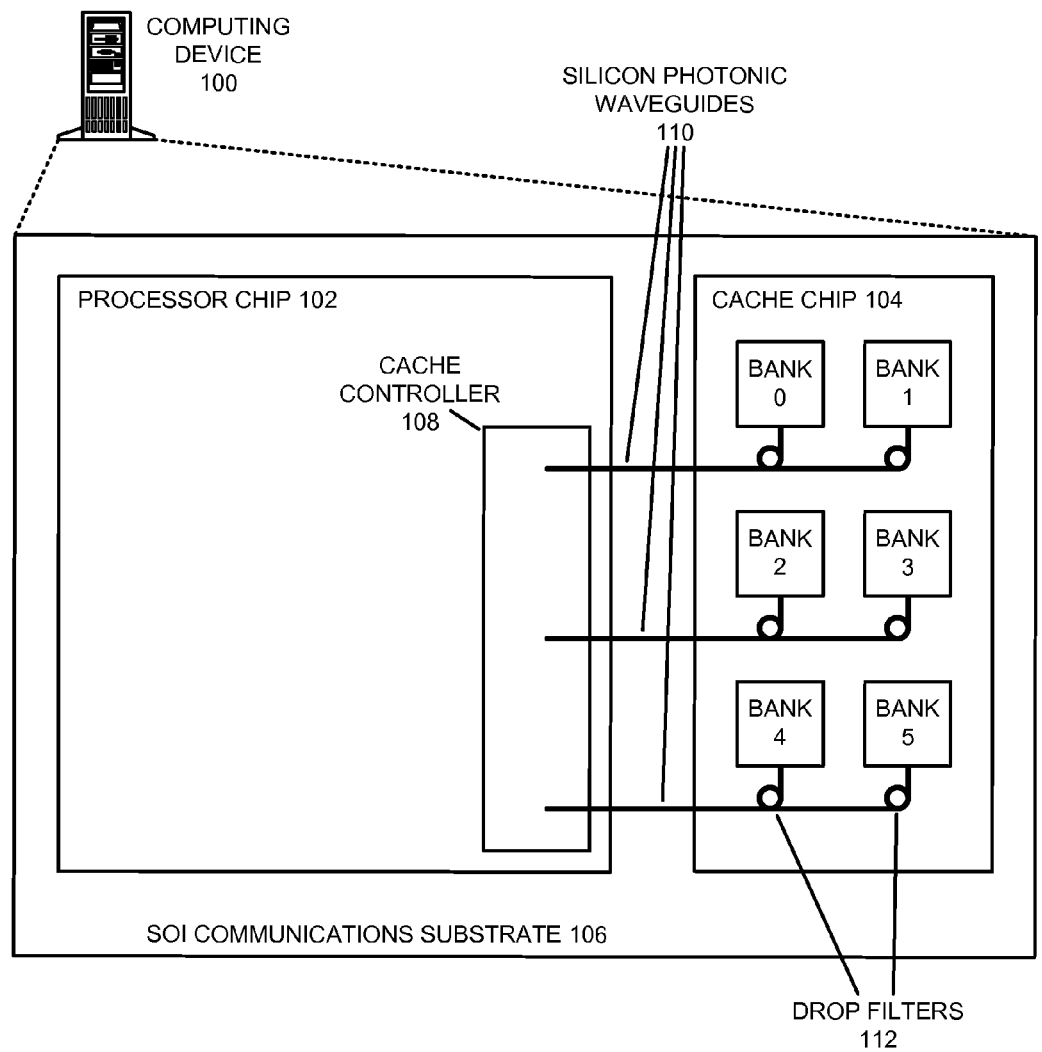
FIG. 1A illustrates the top view of an exemplary computing device that includes a separate processor chip and a cache chip that communicate using silicon photonic waveguides in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Cache Limitations in Computer Systems

In a processor, high instruction throughput typically involves rapid translation of virtual addresses and fast memory accesses. Hence, a processor may include a number of specialized hardware structures to cache frequently accessed data and to speed up address translations. In modern processors, such specialized hardware structures may include multiple levels of caches and multiple levels of translation lookaside buffers (TLBs), which cache page table translation information. Such caching structures reduce the average latency of memory accesses as the gap between processor and memory speeds continues to grow.

However, there are many challenges and limitations in cache design. Any workload that does not fit entirely in a cache would benefit from larger caches. Unfortunately, in single-chip processor designs, the amount of space available for caches is limited by the area required for the processor cores and other structures. Thus, there is an engineering tradeoff (e.g., an area tradeoff) between the performance that can be gained by increasing cache sizes and the performance that can be gained by using a comparable number of transistors on other structures. Such area tradeoffs, in conjunction with other factors such as die yields that serve to limit the overall size of chips, limit cache sizes.

Another issue is that large caches may experience significant wire delay, and hence require optimized wire designs to reduce cache latency. Large caches typically occupy significant chip area, and thus transmitting signals across the cache may involve long wires that can substantially increase cache-access delays (e.g., wire delays for unoptimized wires may cause delays of up to 20 times the access time of an individual cache bank). Optimized wires (e.g., higher-capacity wires) can reduce this latency, but require additional area. Alternatively, if the area needed for optimized wires is too high, a switched network can be used to share wires between cache banks. However, this switched network may add additional latency due to contention and buffering overhead.

For a large, single-banked cache, the access latency for the cache is limited by the access time for the slowest part of the structure. Optimized wires can reduce the access times of the slowest (e.g., farthest away) areas of the structure. Another approach reduces average cache access times by splitting a large cache into multiple cache banks; some of these cache banks will be located closer to the request lines than others, and hence can be accessed with lower latency. Such organizations are referred to as non-uniform cache architectures (NUCA). However, in NUCA systems, situations where frequently accessed data is located in slower cache banks can lead to reduced performance. Some techniques attempt to overcome these issues by moving frequently accessed data into cache banks that are closer to the core, thereby reducing cache-access latency. However, such techniques require additional complexity as well as additional space and time overhead for tracking accesses and moving data. Some cache designs instead attempt to reduce non-uniformity and maximize performance by using a heterogeneous mix of latency-optimized, high-area wires and area-efficient, higher-latency wires to equalize the latency of different cache banks.

Some cache designs attempt to avoid area tradeoffs by locating cache structures on a separate chip. However, approaches that use electronic wires to communicate between separate processor and cache chips typically do not scale with increases in processor performance. Off-chip caches require a large amount of bandwidth to support communication from the cores. Unfortunately, existing off-chip electronic connection technologies (e.g., pins, solder balls and micro-solder bumps) are not sufficiently dense to provide the needed bandwidth. For instance, the density of electronic IO pins on a chip is typically much lower than the density of on-chip wires, so the available off-chip bandwidth does not scale to match the bandwidth required to communicate with an off-chip cache. Hence, off-chip bandwidth is often a scarce resource that is better used for connections to DRAM memory and other non-cache input/output (IO). Note also that this off-chip-bandwidth scalability issue becomes more of a bottleneck for off-chip caches as the number of processor cores on a chip (and thus the compute power and data needs of the chip) increases.

Embodiments of the present invention overcome the limitations of existing cache architectures by using silicon photonic waveguides to connect processor chips directly to individual cache banks on a cache chip. Such techniques provide sufficient bandwidth to access a very large cache on a physically separate chip while maintaining uniformly low-latency access times to each cache bank on the cache chip.

Accessing Off-Chip Caches Via Silicon Photonic Waveguides

In some embodiments, a processor chip uses silicon photonic waveguides to access cache banks of a separate cache chip. These silicon photonic waveguides allow direct optical communication with each individual cache bank on the cache chip, thereby overcoming typical pin limitations and wire delays. Furthermore, by eliminating off-chip bandwidth issues, the described techniques facilitate using a separate cache chip to avoid the above-described area tradeoffs, thereby allowing the design of a large cache that can improve performance without access-time limitations.

In some embodiments, optical waveguides are arranged in a separate layer from cache circuitry, thereby allowing the waveguides to be routed directly to each cache bank. Optical signals routed via such waveguides have substantially lower latency than un-optimized electronic wires, as well as significantly higher bandwidth density than latency-optimized electronic wires. Note that the additional space required for latency-optimized wires sometimes leads to some additional latencies; latency-optimized wires may need to be electrically switched in order to connect every cache bank while still meeting space constraints. Such switching adds latency, potentially negating the advantage of the optimized wires. In contrast, optical waveguides consume less area and allow direct high-bandwidth connections to cache banks, thereby reducing latency. Note that waveguides often comprise a light-conducting material embedded in silicon (e.g., created via a silicon deposition process), but may also comprise material-free channels through which optical signals can travel.

Figure 1B:
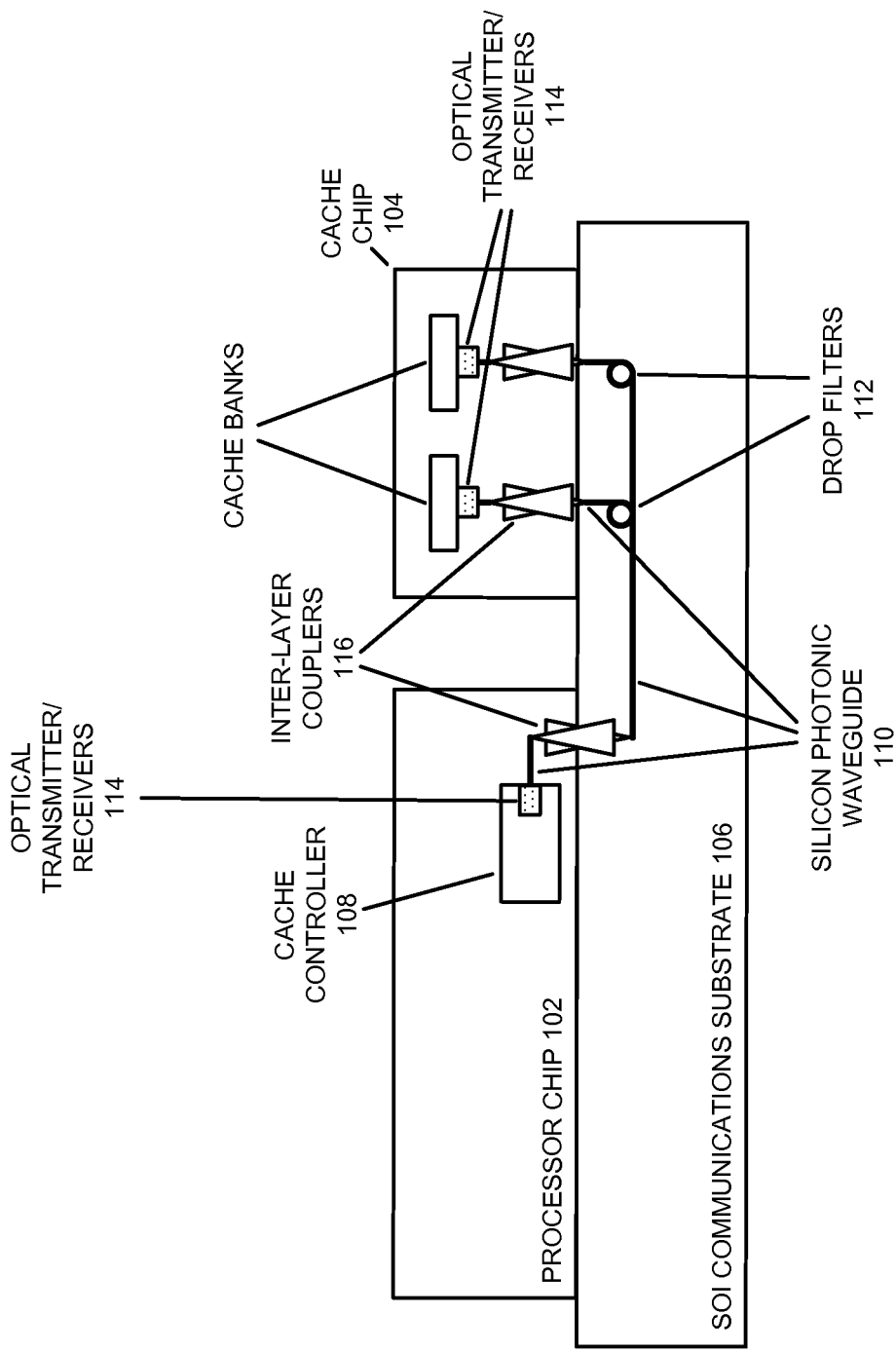
FIG. 1B illustrates the side view of the exemplary computing device of FIG. 1A in accordance with an embodiment.

FIGS. 1A-1B illustrate top and side views (respectively) of an exemplary computing device 100 that includes a separate processor chip 102 and a cache chip 104 with six cache banks. The hardware for computing device 100 is implemented using a dual-layer design, where processor chip 102 and cache chip 104 are on a top layer, but communicate through waveguides in a bottom layer (e.g., silicon-on-insulator (SOI) communications substrate 106).

In FIG. 1A, a cache controller 108 in processor chip 102 communicates with cache chip 104 by sending optical signals through three silicon photonic waveguides 110. Each waveguide connects to two cache banks, with drop filters 112 at each cache bank routing a subset of wavelengths in an optical signal to each respective bank, thereby creating logical point-to-point links.

FIG. 1B illustrates a side view of the layers of computing device 100. Cache controller 108 uses an optical transmitter 114 to send an optical signal via a silicon photonic waveguide 110. An inter-layer coupler 116 (e.g., a diffraction grating or mirror-like structure) routes the optical signal down (via a waveguide) to the SOI communications substrate 106. A drop filter 112 filters the subset of optical wavelengths destined for a target cache bank into another inter-layer coupler 116, which routes the optical signal up to an optical receiver 114 of the target cache bank. Note that FIGS. 1A-1B are conceptual views of computing device 100, and may not be physically accurate; e.g., components are illustrated in the correct layers, but in a schematic manner.

Figure 2:
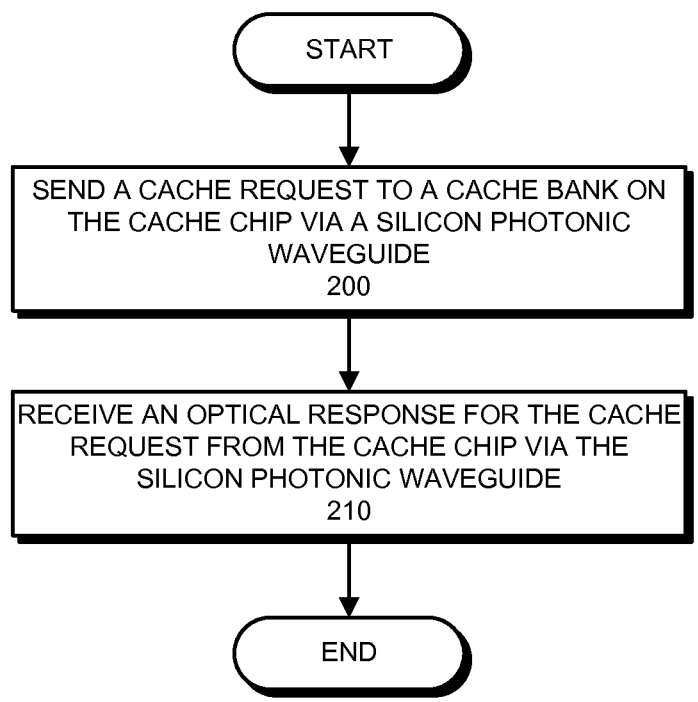
FIG. 2 presents a flow chart that illustrates the process of performing distributed page-table lookups in a shared-memory multiprocessor system with two or more nodes in accordance with an embodiment.

FIG. 2 presents a flow chart that illustrates the process of accessing an off-chip cache via silicon photonic waveguides in a system in which a processor chip and a cache chip are both coupled to a communications substrate. During operation, a structure in the processor chip optically sends a cache request to a cache bank on the cache chip via a silicon photonic waveguide (operation 200). More specifically, the silicon photonic waveguide is comprised of waveguides in the processor chip, the communications substrate, and the cache chip, and forms an optical channel that routes an optical signal directly from the structure to a cache bank in the cache chip via the communications substrate. After the cache bank performs the requested access, the structure in the processor chip receives an optical response for the cache request from the cache chip via the silicon photonic waveguide (operation 210). Note that the internal time needed to perform the cache bank access (after the cache bank receives the request) is typically similar to the time needed by a substantially similar cache bank that is located on a processor chip; however, optical signal transmission between the processor chip and the cache chip is much faster than internal signal transmission within a chip using latency-optimized wires.

Note also that the architecture illustrated in FIGS. 1A-2 is exemplary, and that the described techniques are not limited to the illustrated system; the described techniques and structures can be applied to a range of other architectures. For example:

the number of cache banks and waveguides may vary depending on the design and the total capacity of the cache and the organization of the processor chip;

different architectures may support different granularities of optical connections (e.g., each core of a multi-core processor may be individually optically connected to the banks of the cache chip); and/or different architectures may include a larger substrate that supports multiple processor and/or cache chips that are connected in a range of ways (e.g., a cache chip may be separately optically accessed by multiple processor chips, or one or more processor chips may access multiple cache chips).

For instance, in some embodiments, the disclosed techniques can be used in a "macrochip" (e.g., a multiple-layer system built on a wafer-scale silicon-photonic communication substrate) that contains processors, memory, and other components. In such an environment, chips on a top layer contain optical transmitters and receivers which are connected to waveguides in a lower layer using vertical inter-layer optical couplers. The size of the macrochip system may only be limited by the size of the communication-layer wafer, and thus scale to 64 or more chips.

In some embodiments, a cache chip is entirely dedicated to cache structures, thereby enabling a high-capacity cache comprising fast SRAM cells. This cache may be sub-divided into cache banks in a manner that supports low access latencies for each individual cache bank, with the exact size of each bank, the total number of banks, and the total capacity of the cache depending on the specific design constraints for a target device. For example, a processor design may require that a processor core receive cache results in a certain number of cycles (e.g., at most in the low tens of processor cycles), thereby motivating the cache chip to be divided into a number of cache-banks that are sized to meet that latency requirement. Note that in some embodiments processor chips (and/or cores) still include higher-level cache structures, and the cache chip serves as a shared last-level cache for the cores.

In some embodiments, a cache controller on a processor chip is configured to be the primary structure that interacts with the cache banks of a cache chip. In such designs, the cache controller is optically connected to the waveguides for all of the cache banks, and directs cache requests received from processor cores to the appropriate cache banks (e.g., by using some portion of a physical address to determine a target bank). In some alternative embodiments, each processor core is configured to directly access cache banks (e.g., each processor core includes logic to determine an appropriate target cache bank, and is optically connected to the set of cache banks). In either set of embodiments, cache banks may be configured to buffer multiple requests from different sources (e.g., in the alternative embodiments, cache banks may include an electrical switch to differentiate between and buffer requests from different cores). Note that if the number of cache banks is large, the probability that two cores will simultaneously initiate requests to the same cache bank is relatively small, so the cache banks may not need to perform a substantial amount of buffering.

In some embodiments, point-to-point optical links between requestors (e.g., one or more cache controllers and/or processor cores) and each cache bank reduce access latency and hence improve performance. However, if the number of cache banks scales to become very large, or a large number of structures are connected to each cache bank, the amount of space needed for the optical waveguides may become large. In some alternative embodiments, these optical connections may be shared using optical switching techniques. For example, the communications substrate may include a smaller set of optical channels (than would be used for point-to-point links) that are routed to subsets of banks, and perform optical switching to route requests to specific target cache banks.

In some embodiments, silicon photonic links connecting multiple chips are designed to minimize the latency added by distance and conversion between optical and electronic signaling. For instance, routing waveguides all the way to a cache bank substantially reduces latency over techniques that only use optical connections between the edges of two chips (e.g., not all the way from the requestor to an individual cache bank) and then use additional electrical wiring (and add additional wire latency) to reach the desired target structures. For example, optical transmitters and receivers may be placed next to each cache bank in a cache chip to ensure that a request signal is transmitted optically for the majority of its trip. Such placement provides high-speed communication with a lower latency than unoptimized wires and a higher density than optimized wires; this density advantage allows a larger number of unswitched optical links to fit in a given area (in comparison with wire-based techniques), and thus allows the disclosed architecture to scale well as the number of cache banks (and hence the number of needed optical links) increases. Note that using dedicated optical channels that terminate as closely as possible to each cache bank maximizes the benefit of silicon photonic waveguides. For instance, while some attempts to mitigate electronic wire delay in large caches use multiple banks with heterogeneous access latencies (as described previously), using direct optical links to cache banks provides uniformly low access latency, thereby directly eliminating network contention and non-uniform cache access issues that arise due to uneven wire latencies.

In some embodiments, each optical channel may use wavelength division multiplexing (WDM) techniques to carry multiple wavelengths of light that are then selectively redirected to individual cache banks. For instance, one optical channel may be routed to multiple cache banks, with a drop filter near each cache bank rerouting the wavelengths for each given cache bank to that cache bank's respective waveguide.

Note that while the above description often describes exemplary optical communication from a processor and/or cache controller to a cache bank, the disclosed communication channels and techniques can be bi-directional, and facilitate substantially similar communication occurring from the cache banks to the structures on the other side of the waveguides. For instance, a cache bank can use WDM-enabled waveguides to communicate with multiple cores, or multiple cache banks can communicate with multiple processor cores and/or cache controllers using WDM or a switched optical network.

In summary, embodiments of the present invention overcome the limitations of existing cache architectures by using silicon photonic waveguides to connect processor chips directly to individual cache banks on a cache chip. Such techniques provide sufficient bandwidth to access a large cache on the physically separate cache chip while maintaining uniformly low-latency access times for each cache bank on that cache chip. More specifically, by routing waveguides all the way from a requester to an individual cache bank, the disclosed techniques: (1) eliminate issues related to wire delays and non-uniform cache access latencies; (2) avoid area tradeoffs in the processor chip by locating a large cache off-chip; and (3) use high-bandwidth, low-latency optical links to overcome the communication penalties often associated with inter-chip cache accesses. Such architectures facilitate considerably increasing the size of last-level caches (e.g., increasing a last-level cache size to eight or more times the possible size of an on-chip last-level cache), thereby significantly improving performance.

Computing Environment

Figure 3:
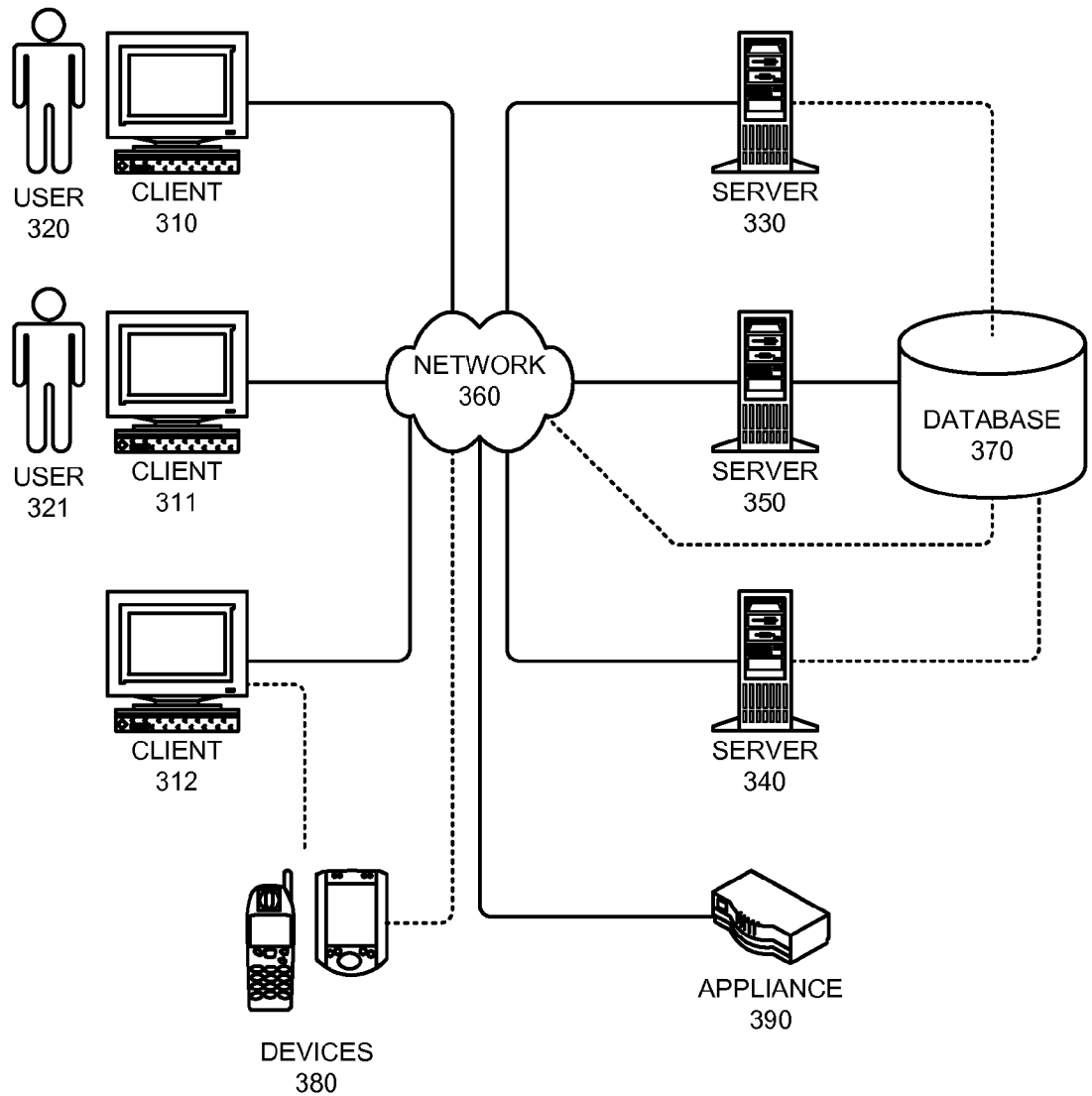
FIG. 3 illustrates a computing environment in accordance with an embodiment.

In some embodiments of the present invention, off-chip caches that are accessed via silicon photonic waveguides can be incorporated into a wide range of computing devices in a computing environment. For example, FIG. 3 illustrates a computing environment 300 in accordance with an embodiment of the present invention. Computing environment 300 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 3, computing environment 300 includes clients 310-312, users 320 and 321, servers 330-350, network 360, database 370, devices 380, and appliance 390.

Clients 310-312 can include any node on a network that includes computational capability and includes a mechanism for communicating across the network. Additionally, clients 310-312 may comprise a tier in an n-tier application architecture, wherein clients 310-312 perform as servers (servicing requests from lower tiers or users), and wherein clients 310-312 perform as clients (forwarding the requests to a higher tier).

Similarly, servers 330-350 can generally include any node on a network including a mechanism for servicing requests from a client for computational and/or data storage resources. Servers 330-350 can participate in an advanced computing cluster, or can act as stand-alone servers. For instance, computing environment 300 can include a large number of compute nodes that are organized into a computing cluster and/or server farm. In one embodiment of the present invention, server 340 is an online "hot spare" of server 350. In other embodiments, servers 330-350 include coherent shared-memory multiprocessors.

Users 320 and 321 can include: an individual; a group of individuals; an organization; a group of organizations; a computing system; a group of computing systems; or any other entity that can interact with computing environment 300.

Network 360 can include any type of wired or wireless communication channel capable of coupling together computing nodes. This includes, but is not limited to, a local area network, a wide area network, or a combination of networks. In one embodiment of the present invention, network 360 includes the Internet. In some embodiments of the present invention, network 360 includes phone and cellular phone networks.

Database 370 can include any type of system for storing data in non-volatile storage. This includes, but is not limited to, systems based upon magnetic, optical, or magneto-optical storage devices, as well as storage devices based on flash memory and/or battery-backed up memory. Note that database 370 can be coupled: to a server (such as server 350), to a client, or directly to a network.

Devices 380 can include any type of electronic device that can be coupled to a client, such as client 312. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 380 can be coupled directly to network 360 and can function in the same manner as clients 310-312.

Appliance 390 can include any type of appliance that can be coupled to network 360. This includes, but is not limited to, routers, switches, load balancers, network accelerators, and specialty processors. Appliance 390 may act as a gateway, a proxy, or a translator between server 340 and network 360.

Note that different embodiments of the present invention may use different system configurations, and are not limited to the system configuration illustrated in computing environment 300. In general, any device that includes a processor chip and a separate cache chip may incorporate elements of the present invention.

In some embodiments of the present invention, some or all aspects of cache chips with optically accessed cache banks can be implemented as dedicated hardware modules in a computing device. These hardware modules can include, but are not limited to, processor chips, application-specific integrated circuit (ASIC) chips, field-programmable gate arrays (FPGAs), memory chips, and other programmable-logic devices now known or later developed.

Note that a processor can include one or more specialized circuits or structures that support optically accessed cache banks. Alternatively, operations that optically access cache banks in a separate cache chip may be performed using general-purpose circuits that are configured using processor instructions. Also, while FIGS. 1A-1B illustrate accessing a cache chip from a processor chip, in alternative embodiments some or all of these mechanisms can be external to a processor chip.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computing device, comprising:
a communications substrate;
a processor chip coupled to the communications substrate, the processor chip comprising a cache controller; and
a cache chip coupled to the communications substrate, wherein the cache chip comprises two or more cache banks, and wherein the processor chip and the cache chip are separate, distinct semiconductor chips; and
a silicon photonic waveguide which forms an optical channel that routes an optical signal from an optical transmitter in the cache controller directly to an optical receiver in a first cache bank in the cache chip, wherein the optical channel provides an end-to-end optical link between a structure in the processor chip and the first cache bank, thereby allowing each cache bank on the cache chip to be accessed with uniform latency, wherein separate bi-directional optical channels route optical signals from the cache controller to each cache bank of the cache chip;
wherein separate, distinct silicon photonic waveguides route optical signals to each cache bank in the cache chip;
wherein the silicon photonic waveguides are arranged in a separate layer from the cache circuitry;
wherein the optical channel comprises a first silicon photonic waveguide in the processor chip, a second silicon photonic waveguide in the communications substrate, and a third silicon photonic waveguide in the cache chip;
where the first silicon photonic waveguide routes the optical signal to the second silicon photonic waveguide via a first inter-layer coupler; and
wherein the optical signal is routed from the second silicon photonic waveguide to a third silicon photonic waveguide via a second inter-layer coupler.

2. The computing device of claim 1,
wherein each optical channel transmits optical signals directly from the structure to the cache bank associated with the respective optical channel; and
wherein the cache bank associated with the respective optical channel performs a lookup operation in response to a received optical signal and then uses the silicon photonic waveguide to optically send a response to the structure.

3. The computing device of claim 2,
wherein the cache controller receives cache requests from multiple processor cores in the processor chip; and
wherein the cache controller determines a target cache bank on the cache chip for a cache request and then routes the cache request to the silicon photonic waveguide associated with the target cache bank.

4. The computing device of claim 2, wherein transmitting optical signals from the cache controller directly to two or more cache banks on the cache chip facilitates reducing the wire latency of cache accesses.

5. The computing device of claim 2,
wherein the silicon photonic waveguide comprises multiple optical channels that are partitioned using wavelength-division multiplexing;
wherein multiple wavelengths transmit optical signals to multiple cache banks;
wherein each of the multiple cache banks sharing the silicon photonic waveguide is associated with a different optical wavelength; and
wherein an optical signal destined for the first cache bank is routed to the first cache bank using a drop filter that filters the optical wavelength associated with the first cache bank.

6. The computing device of claim 2,
wherein two or more silicon photonic waveguides are combined into an optically switched network that is managed by an optical switch; and
wherein the optical switch selectively routes a cache request to the first cache bank.

7. The computing device of claim 2, wherein the computing device further comprises:

a second cache chip coupled to the communications substrate;
wherein the cache controller is further configured to communicate with one or more cache banks on the second cache chip using one or more silicon photonic waveguides.

8. The computing device of claim 2, wherein the computing device further comprises:
a second processor chip coupled to the communications substrate;
wherein a second structure in the second processor chip is configured to directly, optically communicate with the first cache bank via the communications substrate using a second silicon photonic waveguide; and
wherein the second silicon photonic waveguide is embedded in the second processor chip, the communications substrate, and the cache chip.

9. The computing device of claim 2,
wherein an inter-layer coupler guides the optical signal from the processor chip into a portion of the silicon photonic waveguide in the communications substrate; and
wherein a second inter-layer coupler guides the optical signal from the portion of the silicon photonic waveguide in the communications substrate into the cache chip.

10. A cache chip that is accessed via silicon photonic waveguides, comprising:
two or more cache banks;
wherein the cache chip is coupled to a communications substrate;
wherein the cache chip receives cache requests from a processor chip coupled to the communications substrate, wherein the processor chip and the cache chip are separate, distinct semiconductor chips, and wherein the processor chip comprises a cache controller;
wherein a silicon photonic waveguide forms an optical channel that routes an optical signal from an optical transmitter in the cache controller directly to an optical receiver in a first cache bank in the cache chip via the communications substrate, wherein the optical channel provides an end-to-end optical link between the a structure in the processor and the first cache bank, thereby allowing each cache bank on the cache chip to be accessed with uniform latency;
wherein separate bi-directional optical channels route optical signals from the cache controller to each cache bank of the cache chip;
wherein separate, distinct silicon photonic waveguides route optical signals to each cache bank in the cache chip;
wherein the silicon photonic waveguides are arranged in a separate layer from the cache circuitry;
wherein the optical channel comprises a first silicon photonic waveguide in the processor chip, a second silicon photonic waveguide in the communications substrate, and a third silicon photonic waveguide in the cache chip;
where the first silicon photonic waveguide routes the optical signal to the second silicon photonic waveguide via a first inter-layer coupler; and
wherein the optical signal is routed from the second silicon photonic waveguide to a third silicon photonic waveguide via a second inter-layer coupler.

11. The cache chip of claim 10,
wherein each optical channel transmits optical signals directly from the structure to the cache bank associated with the respective optical channel; and
wherein the cache bank associated with the respective optical channel performs a lookup operation in response to a received optical signal and then uses the silicon photonic waveguide to optically send a response to the structure.

12. The cache chip of claim 11,
wherein the cache controller receives cache requests from multiple processor cores in the processor chip; and
wherein the cache controller determines a target cache bank on the cache chip for a cache request and then routes the cache request to the silicon photonic waveguide associated with the target cache bank.

13. The computing device of claim 11, wherein transmitting optical signals from the cache controller directly to two or more cache banks on the cache chip facilitates reducing the wire latency of cache accesses.

14. The computing device of claim 11,
wherein the silicon photonic waveguide comprises multiple optical channels that are partitioned using wavelength-division multiplexing;
wherein multiple wavelengths transmit optical signals to multiple cache banks;
wherein each of the multiple cache banks sharing the silicon photonic waveguide is associated with a different optical wavelength; and
wherein an optical signal destined for the first cache bank is routed to the first cache bank using a drop filter that filters the optical wavelength associated with the first cache bank.

15. The computing device of claim 11,
wherein a second processor chip is coupled to the communications substrate;
wherein a second structure in the second processor chip is configured to directly, optically communicate with the first cache bank via the communications substrate using a second silicon photonic waveguide; and
wherein the second silicon photonic waveguide is embedded in the second processor chip, the communications substrate, and the cache chip.

16. A method for optically communicating with a cache chip via a silicon photonic waveguide, the method comprising:
optically sending a cache request from an optical transmitter in a cache controller in a processor chip to the cache chip via the silicon photonic waveguide, wherein the processor chip and the cache chip are coupled to a communications substrate, wherein the processor chip and the cache chip are separate, distinct semiconductor chips, wherein the cache chip comprises two or more cache banks, wherein the silicon photonic waveguide forms an optical channel that routes the cache request from a structure in the processor chip directly to an optical receiver in a first cache bank in the cache chip via the communications substrate, wherein the optical channel provides an end-to-end optical link between a structure in the processor chip and the first cache bank, thereby allowing each cache bank on the cache chip to be accessed with uniform latency;
wherein separate bi-directional optical channels route optical signals from the cache controller to each cache bank of the cache chip;
wherein separate, distinct silicon photonic waveguides route optical signals to each cache bank in the cache chip;
wherein the silicon photonic waveguides are arranged in a separate layer from the cache circuitry;
wherein the optical channel comprises a first silicon photonic waveguide in the processor chip, a second silicon photonic waveguide in the communications substrate, and a third silicon photonic waveguide in the cache chip;
where the first silicon photonic waveguide routes the optical signal to the second silicon photonic waveguide via a first inter-layer coupler; and
wherein the optical signal is routed from the second silicon photonic waveguide to a third silicon photonic waveguide via a second inter-layer coupler; and
receiving an optical response for the cache request from the cache chip via the silicon photonic waveguide.

* * * * *